(12) United States Patent
Chen et al.

(10) Patent No.: US 7,475,364 B2
(45) Date of Patent: *Jan. 6, 2009

(54) INTERACTIVE TOPOLOGY GRAPHS FOR VISUALIZATION AND CHARACTERIZATION OF SONET CONSUMPTION PATTERNS

(75) Inventors: Chuxin Chen, San Francisco, CA (US); Ralph Gnauck, San Francisco, CA (US); George T. Noll, Escondido, CA (US)

(73) Assignee: SBC Technology Resources, Inc., Austin, TX (US)

( * ) Notice: Subject to any disclaimer, the term of this patent is extended or adjusted under 35 U.S.C. 154(b) by 301 days.

This patent is subject to a terminal disclaimer.

(21) Appl. No.: 11/202,421

(22) Filed: Aug. 11, 2005

(65) Prior Publication Data

US 2006/0080611 A1 Apr. 13, 2006

Related U.S. Application Data

(63) Continuation of application No. 09/675,628, filed on Sep. 29, 2000, now Pat. No. 6,981,228.

(51) Int. Cl.
*G06F 3/00* (2006.01)
*G06F 11/32* (2006.01)
*G06F 17/30* (2006.01)

(52) U.S. Cl. ............... 715/853; 715/734; 715/771; 715/810; 709/224; 398/9; 398/17; 398/59

(58) Field of Classification Search ............... 715/734, 715/736, 762, 763, 764, 771, 810, 846, 853, 715/854; 709/223, 224; 398/9, 10, 17, 58, 398/59, 107, 109, 110
See application file for complete search history.

(56) References Cited

U.S. PATENT DOCUMENTS

| 5,295,244 | A | | 3/1994 | Dev et al. |
|---|---|---|---|---|
| 5,412,652 | A | * | 5/1995 | Lu ............................ 370/223 |
| 5,621,383 | A | * | 4/1997 | Yoshiyama ................. 340/506 |
| 5,715,432 | A | * | 2/1998 | Xu et al. ...................... 715/764 |
| 5,751,965 | A | | 5/1998 | Mayo et al. |
| 5,761,429 | A | | 6/1998 | Thompson |
| 5,768,552 | A | | 6/1998 | Jacoby |
| 5,774,669 | A | | 6/1998 | George et al. |

(Continued)

OTHER PUBLICATIONS

"Sonet management", Aug. 15, 1997, America's Network, 101, 16, p. 48.*

(Continued)

*Primary Examiner*—X. L Bautista
(74) *Attorney, Agent, or Firm*—Haynes and Boone, LLP (57) ABSTRACT

A computer-based monitoring system provides interactive topology information about a synchronized optical network (SONET). The monitoring system utilizes a trunks integrated record keeping system (TIRKS) connected to the SONET for collecting status data in a raw format. A computer system retrieves the raw format status data from TIRKS and provides the data in a simple graphical user interface to a user. The interface includes several menus from which the user may specify specific components of the SONET, and a graphical output for providing a graphical representation of the SONET. The graphical output illustrates each node and link and interactively provides more detailed information about any user selected link or node.

28 Claims, 5 Drawing Sheets

U.S. PATENT DOCUMENTS

| | | | | |
|---|---|---|---|---|
| 5,867,484 | A | * | 2/1999 | Shaunfield ............ 370/395.51 |
| 5,870,558 | A | | 2/1999 | Branton, Jr. et al. |
| 5,909,217 | A | | 6/1999 | Bereiter |
| 5,910,803 | A | | 6/1999 | Grau et al. |
| 6,031,528 | A | | 2/2000 | Langfahl, Jr. |
| 6,040,834 | A | | 3/2000 | Jain et al. |
| 6,058,103 | A | | 5/2000 | Henderson et al. |
| 6,067,093 | A | | 5/2000 | Grau et al. |
| 6,295,540 | B1 | * | 9/2001 | Sanschagrin et al. ........ 707/201 |
| 6,330,005 | B1 | * | 12/2001 | Tonelli et al. ............... 715/735 |
| 6,735,215 | B1 | * | 5/2004 | Cao ............................ 370/437 |
| 6,959,000 | B1 | * | 10/2005 | Lee ............................ 370/404 |
| 6,992,975 | B1 | * | 1/2006 | Daniel et al. ................ 370/222 |
| 7,173,936 | B1 | * | 2/2007 | Semaan ................. 370/395.51 |

OTHER PUBLICATIONS

Pamela Fruth, "Fluke Networkds SwitchWizard", 1996, Network Computing, n712, p. 180.*

"LANScape SNMP monitors MIBs for Mac networks", Feb. 1996, LAN Magazine, v11, n2, p. 143(2).*

Barry Nance, "SLA enforcement tools to the rescue Visual UpTime wins Blue Ribbon Award for accuracy and reporting features", Apr. 3, 2000, Network World, p. 69.*

Alan Zeichick, "Predicting Failure", Sep. 4, 2000, InternetWeek, v827, p. 33(3).*

Mel Beckman, "InterMapper 2.0", Jun. 1998, Macworld, 15, 6, p. 39.*

Kristin Marks, "Pleased to meter you", Dec. 11, 1995, Network World, p. 53.*

"Network Management: Alcatel Telecom simplifies the management of telecommunications networks", Jul. 1, 1996, Newsletter.*

David Rorabaugh, "Expose' delivers multi-NOS management", Apr. 17, 1995, Network World, p. 40.*

Jodi Cohen, "Negotiating the fast LAN technology maze Special Focus, High-Speed-LANs", Nov. 6, 1995, Network World, p. 96.*

"VPN RFP—Altiga", May 10, 1999, Network World.*

Dan Backman, "Jetlan is Doppler radar for your network", Apr. 1, 1997, Network Computing, v8, issue 6, p. 48, 2p, 1c.*

Todd Coopee, "HP OpenView Network Node Manager helps administrators build a solid enterprise management framework", Feb. 6, 1995, Network World, p. 33.*

Des Desikan, "Bringing strategic value to network management systems", Dec. 1990, Telecommunications, v24, n12, p. 60(3).*

Gilbert Held, "Shopping for frame relay", Dec. 1997, Network, v12, n13, p. 83(4).*

Kristina B. Sullivan, "Management's in the Bag", May 11, 1998, PC Week, p. 83.*

* cited by examiner

INTERACTIVE TOPOLOGY GRAPHS FOR VISUALIZATION AND CHARACTERIZATION OF SONET CONSUMPTION PATTERNS

RELATED APPLICATIONS

This application is a continuation of U.S. application Ser. No. 09/675,628 filed Sep. 29, 2000 entitled, now U.S. Pat. No. 6,981,228 "Interactive Topology Graphs for Visualization and Characterization of Sonet Consumption Patterns."

BACKGROUND

The present invention relates generally to telecommunications and more particularly, to a system and method for monitoring telecommunication network activities.

It is often desired to monitor specific activities of various aspects of a telecommunication network. Traditionally, the monitoring has been hardware specific. For example, a monitoring system can show if a node or link in a network is up or down, and can set off alarms accordingly. Such monitoring works well with a realtime analysis of the hardware in the network.

However, it is often desired to monitor other aspects of the network. Consider for example a synchronized optical network (a "SONET") ring or chain. SONET was proposed by Bellcore in the middle 1980s as a standard for connecting fiber-optic transmission systems. SONET defines interface standards at the physical layer, including a hierarchy of interface rates that allow data streams at different rates to be multiplexed. SONET establishes Optical Carrier ("OC") levels, or speeds. Typical OC levels include OC-1 for 51.85 Mbps, OC-3 for 155.52 Mbps, OC-12 for 622.08 Mbps, OC-24 for 1.244 Gbps, OC-48 for 2.488 Gbps, and OC-192 for 9.9532 Gbps.

One way to track facility assignments and equipment inventory in a SONET ring or chain is to use a system called the Trunks Integrated Record Keeping System ("TIRKS"). TIRKS is commonly used to help a regional bell operating company ("RBOC") determine if facilities exist to provide service, track order completion, fulfill circuit orders, and perform inventory planning.

Although TIRKS provides a great detail of information, the method of acquiring the information is very long and tedious. For example, in order to retrieve information such as consumption patterns of a SONET ring or chain, many steps must be performed on TIRKS. The information provided by TIRKS is in a raw-data format, and must be manually complied into a tabular form to represent the desired information. For a typical SONET ring, this process takes between two to six hours.

What is desired is a system and method that allows a user to quickly determine the status of the SONET ring. This status can be related to such things as available bandwidth and other consumption-related items.

Furthermore, what is desired is an interactive system and method for monitoring a network's status.

Further still, what is desired is a system and method that can provide a great deal of information about a network to a user. The information should be provided in a usable fashion, and should be responsive to user specific information for desired components of the network.

Furthermore, what is desired is a system and method for monitoring a network's status in a very fast manner, as compared to conventional techniques such as running a TIRKS online report facility.

DETAILED DESCRIPTION

The present disclosure relates to monitoring systems, such as can be used in a synchronized optical network ("SONET") ring. It is understood, however, that the following disclosure provides many different embodiments, or examples, for implementing different features of the invention. Specific examples of components and arrangements are described below to simplify the present disclosure. These are, of course, merely examples and are not intended to limit the invention from that described in the claims.

The following disclosure is divided into three different sections. First of all, an exemplary network and system is provided. The exemplary network identifies two telecommunication networks that may benefit from the present invention, and the exemplary system provides an example of a system for providing a graphical user interface for monitoring either or both of the networks. Secondly, a plurality of screen shots are provided for illustrating the graphical user interface. Thirdly, an exemplary software routine is discussed for implementing one embodiment of the graphical user interface.

Exemplary Network and System

Figure 1:
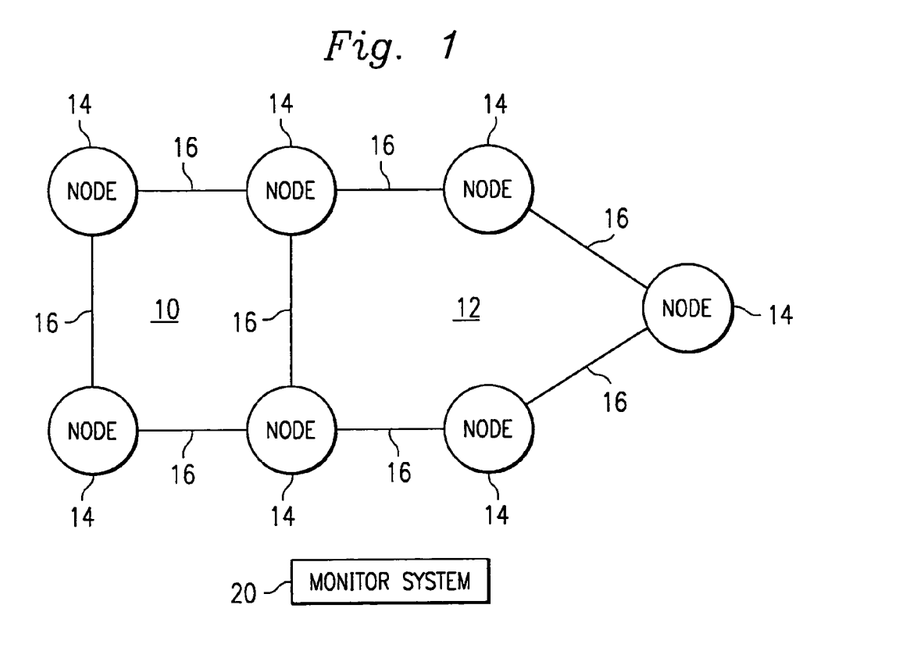
FIG. 1 is a simplified description of several typical SONET rings and a monitor system according to one or more embodiments of the present invention.

Referring to FIG. 1, the reference numerals 10 and 12 designate, in general, two simplified SONET rings. The SONET rings 10, 12 include a plurality of nodes 14 and a plurality of available bandwidth (generically described as links) 16. Some of the nodes exist in both rings 10, 12, and are therefore considered hubs. It is understood that there are various types of nodes, and that the present description is not limited to any particular type. Any node 14 may be representative of a single component, a single facility, or a larger group of components and links. In the present example, each node includes a plurality of terminations where a service enters or exits the SONET ring 10, 12. In continuance of the example, the nodes 14 are designated OC-48, and therefore each node has a potential of 48 "drop ports." Also, it is understood that there are many types of links, with each link having various potentially available bandwidths.

Figure 2:
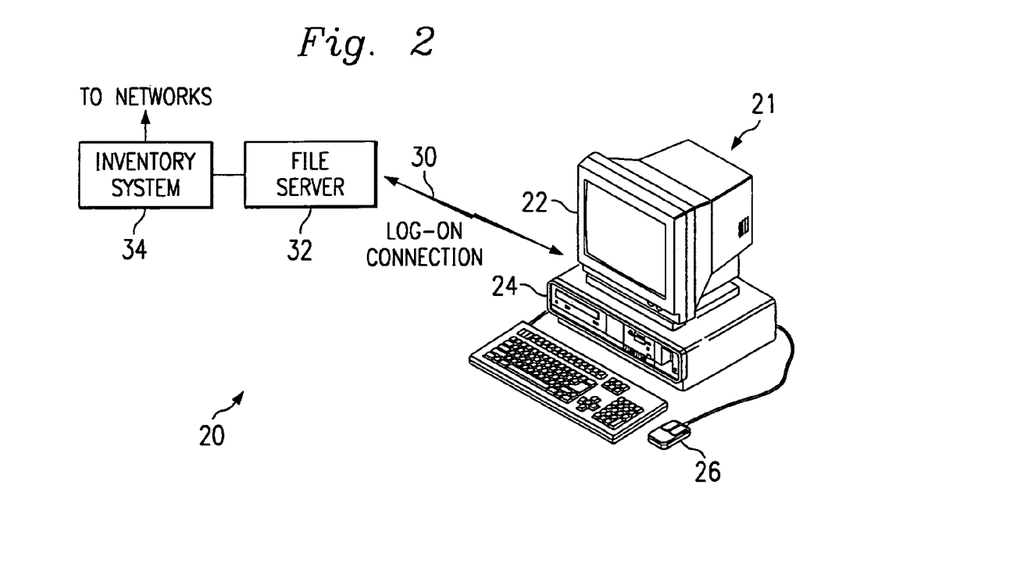
FIG. 2 illustrates a computer system for use with the monitoring system of FIG. 1.

Referring also to FIG. 2, a monitoring system 20 may be connected to one or more nodes of the networks 10, 12. In one embodiment, the monitoring system 20 includes a personal computer 21 with a graphics display 22, a control unit 24, and user inputs 26 such as a keyboard and pointer device. The computer 21 is connected through a log-on connection 30 to a file server 32, which also includes hardware components found in a typical server computer. The file server 32 is further connected to an inventory system 34, such as the TIRKS system discussed above. It is well known by those of ordinary skill in the art that various implementations can exist for the monitoring system 20. For example, in some implementations, the monitoring system 20 may include a larger, mainframe-type computer that is either locally or remotely accessible by a terminal or personal computer. In other implementations, the monitoring system 20 may include a series of computers. In still other implementations, the monitoring system may include or utilize a series of adjunct processors to one or more of the nodes 14.

The monitoring system 20 can perform various software routines that can produce a series of graphical output images. The images are arranged in a unique way to illustrate the status of the SONET ring 10. For example, the images can locate a spare node from among the various nodes of the SONET ring 10. The images can identify usage patterns between two or more nodes. Furthermore, the images can help identify spare bandwidths available. The images are discussed and illustrated below by providing several screen shots, such as may appear on the graphics display 22.

Exemplary Screen Shots

The following discussion is directed to a graphical user interface comprising several different images. Since the images are dynamic and interactive, screen shots of the images will be further discussed. The screen shots relate to exemplary situations of a SONET ring, such as the network 10 or 12 of FIG. 1, at a single moment in time. It is understood that different portions of the screen shots can be combined in various manners to produce even more examples of the graphical user interface.

Figure 3:
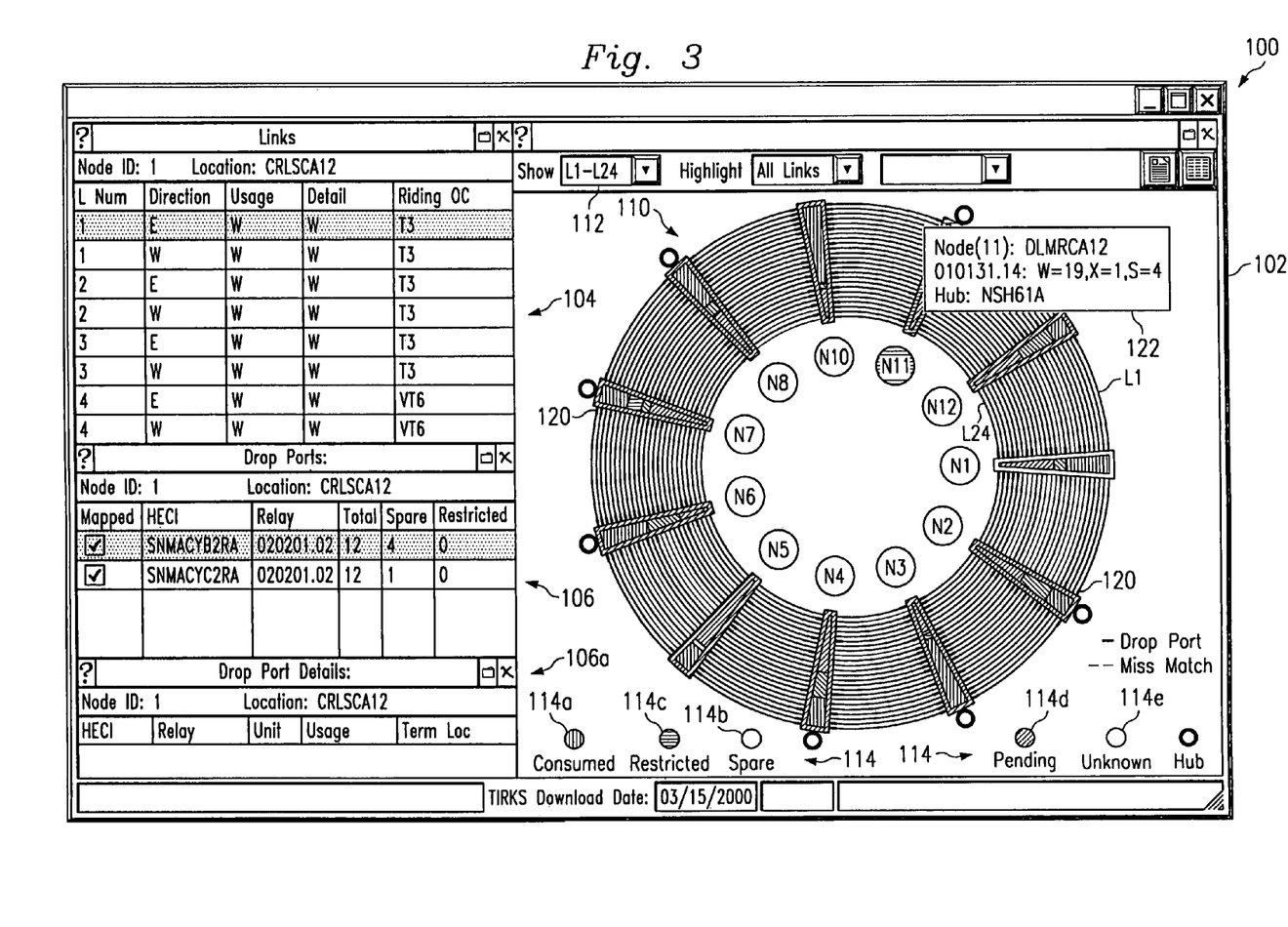
FIGS. 3-5 provide screen shots, such as from the computer system of FIG. 2, that illustrate different embodiments of the present invention.

Referring also to FIG. 3, a screen shot 100 can be used to illustrate a current condition of a SONET ring on the display of a monitoring system. The screen 100 is divided into three main areas: a SONET ring area 102, a link area 104, and a node area 106. The main areas can be further divided, as necessary. For example, in the screen 100, the node area 106 includes a node detail area 106a.

Referring to the SONET ring area 102, a pictorial description of a SONET ring being monitored is displayed in a circular configuration 110. One benefit of the present embodiment is that many nodes and links can be simultaneously displayed. To illustrate this benefit, the SONET ring to be displayed will be larger than those illustrated in FIG. 1, with many more nodes and links.

The ring configuration 110 includes eleven nodes N1-N8 and N10-N12 and a plurality of links L1-L24 between the nodes for the SONET ring. (Note that node N8 is connected to node N10. A node N9 is skipped for future expansion). The specific links L1-L24 are chosen and highlighted by pull down menus 112. In the present example, the configuration 110 illustrates the links L1-L24 between each of the nodes N1-N12.

Figure 4:
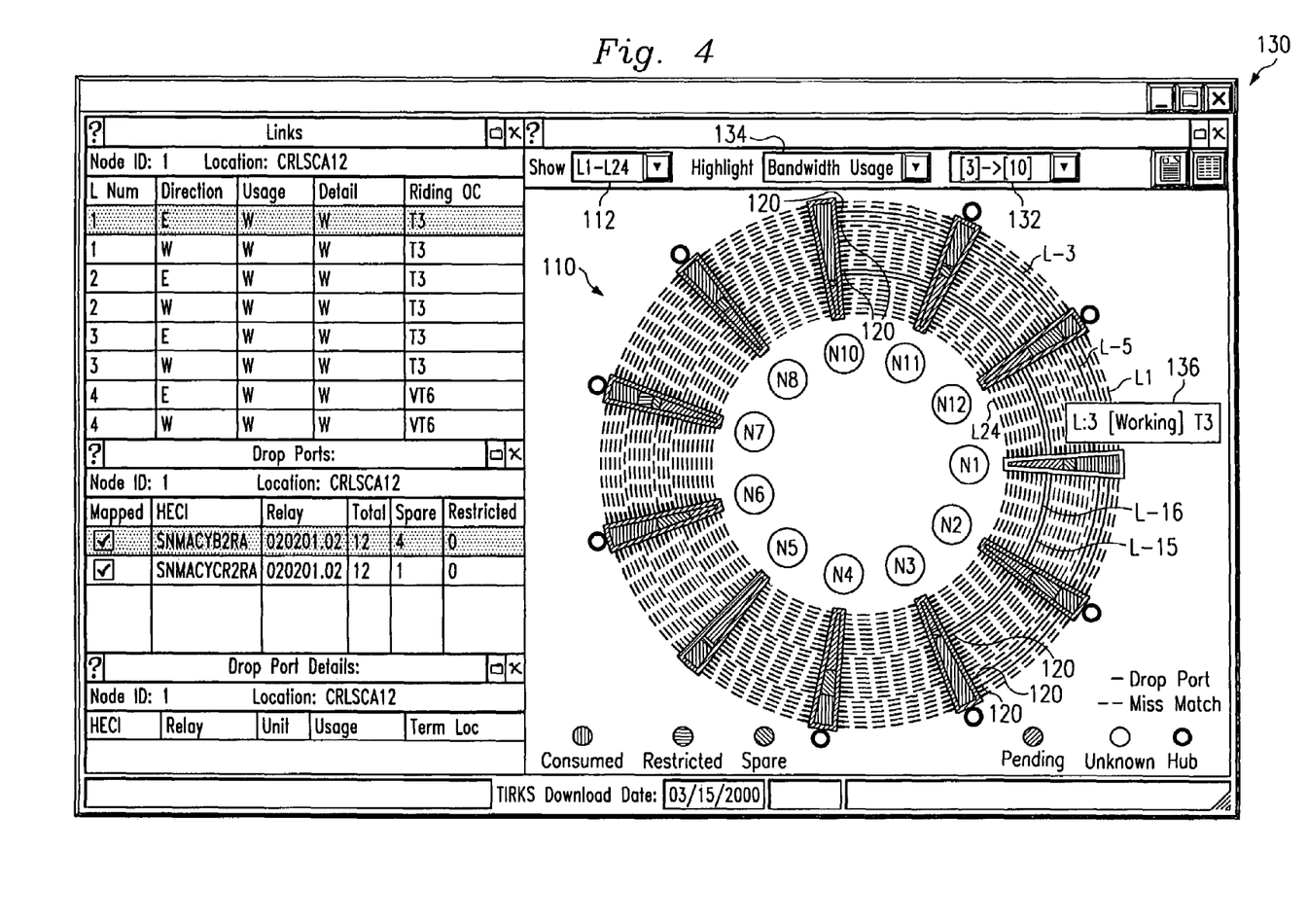
Figure 5:
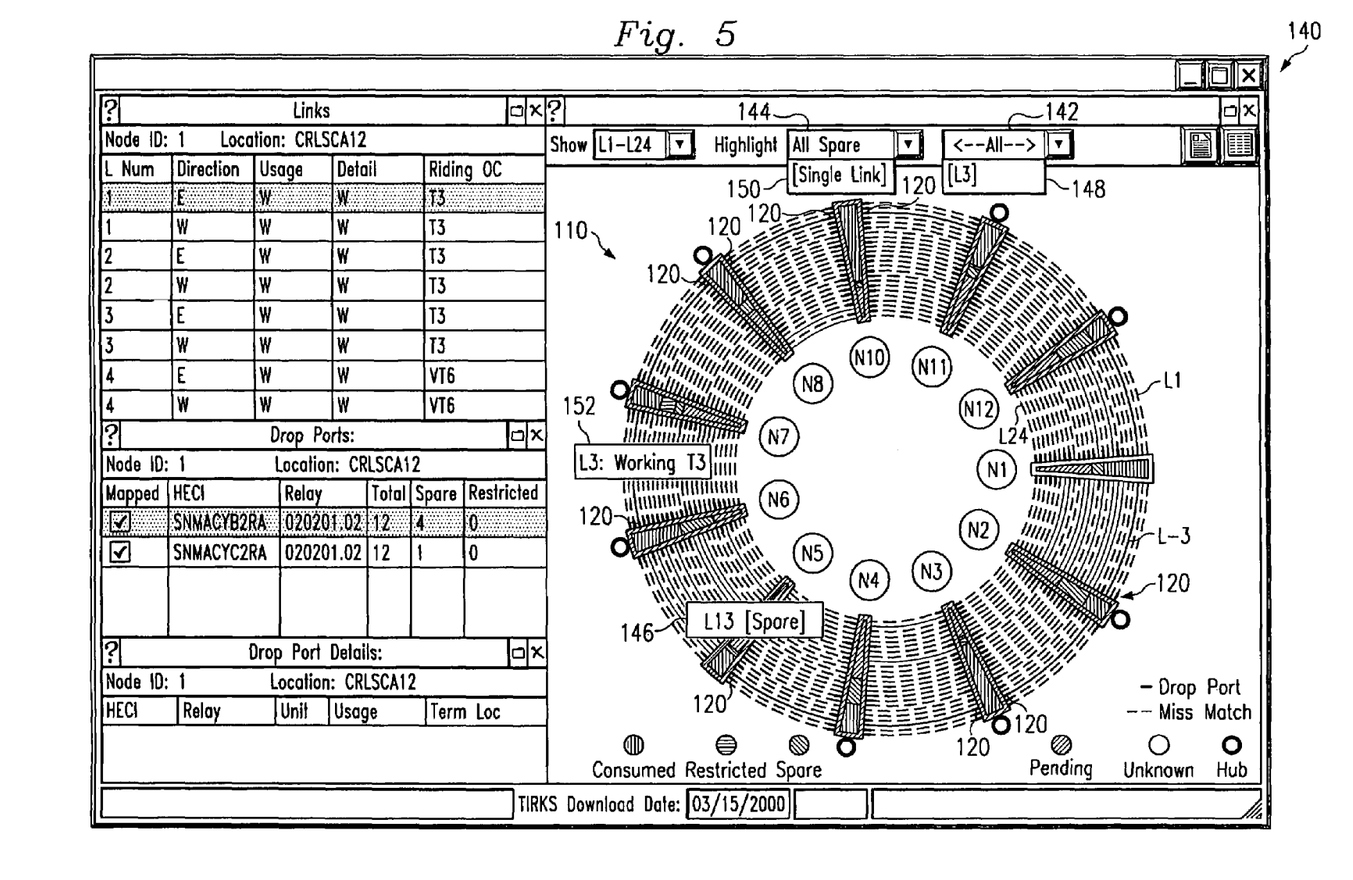

Several of the nodes N1-N8 and N10-N12 serve as hubs. In the present example, a legend 114 identifies that nodes N2, N3, N4, N6, N7, N8, N11, and N12 are hubs. The legend 114 also assigns specific colors to the various nodes and links to indicate a status for each. In FIGS. 3-5, different colors are illustrated with different line styles or hatchings. A first color 114a indicates that a specific link or node is consumed. A second color 114b indicates that a specific link or node is available. The nodes can have additional states, such as restricted 114c, pending 114d, and other 114e. In addition, a mismatch between two nodes can be quickly identified. For example, if one of the links between nodes N2 and N3 is inventoried differently in the two nodes, a mismatch would occur. As such, a status of each node and link can be immediately determined by a user's quick perusal of the ring configuration 110.

On several links there is an indicator 120. The indicator signifies that service on the corresponding link is dropping at that node. The link is therefore consuming one of the drop ports at the corresponding node. For example, there are 13 links dropping at node N2 and 32 links dropping at node N3. The links without the indicator 120 illustrate service that is passing through that node to another node. For example, at node N3, link L4 passes straight through. Instead, link L4 goes between (and consumes drop ports at) node N2 and node N4.

In addition to the information provided in the SONET ring area 102, more detailed information can be provided for a specific node. In the example illustrated in FIG. 3, the node N1 has been "selected" for additional information. The selection process can be performed by using the input devices 26 described above, with reference to FIG. 2, or may be selected by the monitor system 20.

Referring to the link area 104, link information for the selected node is provided in a series of columns: SYS Num, Direction, Usage, Detail, and Riding OC. The column SYS Num provides a list of all the selected links from the pull-down menu 112. The columns Direction, Usage, and Detail provide directions east (E) or west (W) that identify the link and describe the service provided by the corresponding link. The column Riding OC describes other systems riding on the corresponding drop ports. For example, the links L1-L3 east and west are T3's. T3's are synchronous digital carriers used to transmit a formatted digital signal at 45 Mb/s.

Referring to the node area 106, information for the selected node is provided in a series of columns: Mapped, HECI, Relay, Total, Spare, and Restricted. The Mapped, Relay, Total Spare, and Restricted columns describe the various drop ports associated with the node. The HECI column identifies a human equipment common interface (HECI) value. The HECI value provides a summary of specific usage of a particular unit. The HECI value can be provided in greater detail in the node detail area 106a, when such information is available.

As discussed above, in the present example, node N1 is the selected node, but additional information may be desired for one of the non-selected nodes. To find the additional information, the pointer device 26 (FIG. 2) is positioned over a node. In the present example, the pointer device 26 is positioned over node N11. As a result, a window 122 appears with additional information for node N11. In the example shown in FIG. 3, the window 122 indicates that node N11 is a central office identified as DLMRCA12, with a Relay value of 010131.14. The relay has 19 working (W) drop ports, 1 restricted (X) drop port, and 4 spare (S) drop ports. Node N11 is also a hub node (reference number NSH61A), and may therefore connect to one or more additional networks.

Referring now to FIG. 4, a screen shot 130 illustrates bandwidth usage patterns in an interactive manner. A pull-down menu 132 is used to select two nodes in a specific sequence, and a pull-down menu 134 is used to identify bandwidth usage. For the sake of example, the bandwidth usage patterns from node N3 to node N10 is illustrated.

In this example, links L3, L5, L15, and L16 are highlighted as the available links between node N3 and node N10. The links are available because the drop ports 120 exist on the west side (W) of node N3 and the east side (E) of node N10. To find additional information about a particular link, the pointer device 26 (FIG. 2) can be positioned over the link. In the present example, the pointer device 26 is positioned over link L3. As a result, a window 136 appears with additional information for link L3. In the example shown in FIG. 4, the window 136 indicates that link L3 is a working T3 connection between nodes N3 and N1. It is noted that as illustrated in FIG. 4, L3 is a spare link between nodes N6 and N5.

Referring now to FIG. 5, a screen shot 140 identifies spare links in an interactive manner. A pull-down menu 142 is used to select all the links, and a pull-down menu 144 is used to identify a specific status of the links. For the sake of example, all of the spare links are to be identified.

In this example, many links between various nodes are identified. The identified links are spares because there are no drop ports on either side. To find additional information about a particular link, the pointer device 26 (FIG. 2) can be positioned over the link. In the present example, the pointer device 26 is positioned over link L13. As a result, a window 146 appears with additional information for link L13. In the example shown in FIG. 4, the window 146 indicates that link L13 is a spare.

The screen shot 140 also illustrates how a user can select a specific link. Pull-down menus 148, 150 are used to identify the link, accordingly. For the sake of example, link L13 is identified.

In this example, the link is in use between the node N5 to N3, N3 to N10, N10 to N8, and N8 to N6. The link L13 is available (spare) between nodes N6 and N5. In addition to the color scheme provided, the pointer device 26 can be positioned to identify more information about that link. In the present example, the pointer device 26 is positioned over link L3 between nodes N7 and N6. As a result, a window 152 appears with additional information for link L13. In the example shown in FIG. 4, the window 152 indicates that link L3 is a working T3 link.

Software Description

Figure 6:
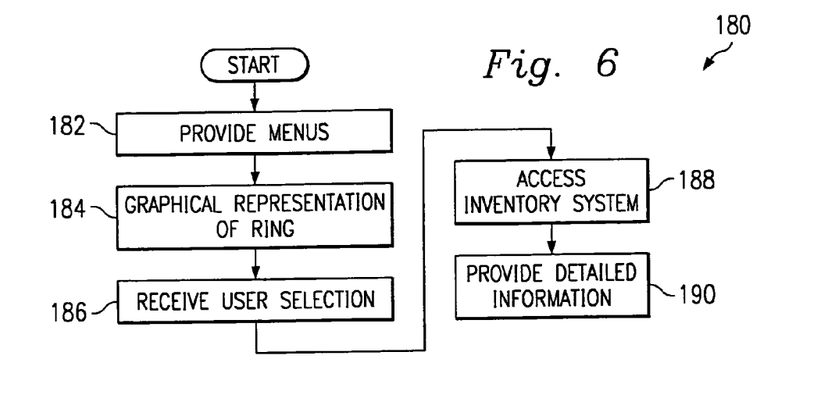
FIG. 6 is one embodiment of a simplified flow chart that illustrates one embodiment of a software program for implementing features of the present invention.

Referring now to FIG. 6, a computer program 180 can be used for visualizing and characterizing at least a portion of a SONET ring, such as the rings 10, 12 of FIG. 1. The computer program 180 may be encoded on a computer readable medium. Execution begins at step 182, where one or more menus are provided from which a user may specify specific components of the SONET ring. At step 184, a graphical representation of the SONET ring illustrating each node and link of the SONET ring specified by the user is calculated and drawn. At step 186, a user selection for identifying one node of the SONET ring is received. At step 188, an inventory system such as TIRKS is accessed for data related to the user selection. At step 190, detailed information about the selected node is displayed.

Figure 7:
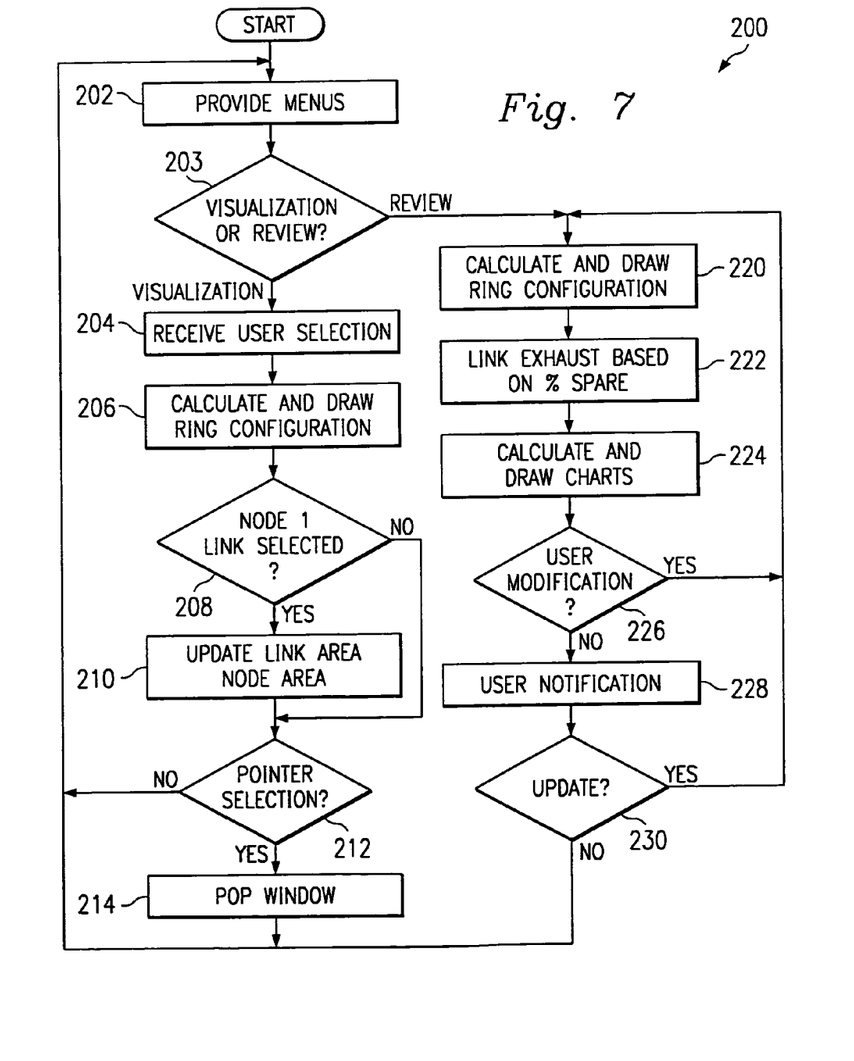
FIG. 7 is a simplified flow chart that illustrates another embodiment of a software program for implementing features of the present invention, including creating the screen shots of FIGS. 3-5.

Referring now to FIG. 7, another software routine 200 can be implemented to visualize and characterize a portion of a SONET ring, such as the rings 10, 12 of FIG. 1. The software routine 200 may be encoded on a computer readable medium and can provide the above described screen shots 100, 130, 140 of FIGS. 3-5 on the monitor system 20. Execution begins at step 202 where a first stage of user input is provided, such as the pull-down menus 112, 132-134, 142-144, and 148-150 of FIG. 3-5. In this way, a user can select specific nodes for a specific size of display. It is understood that as more nodes and links are selected, the granularity of the information provided will also increase. It is further understood that generic aspects of a graphical user interface (GUI), such as pull-down menus, are well understood by those of ordinary skill in the art.

At step 203, the user can choose between two different operations of the routine 200. A visualization process (discussed in steps 204-214, below) is a look-up and read process. This allows the user to quickly and easily determine the status of a SONET ring using one or more of the screen shots 100, 130, 140 discussed above. A review process (discussed in steps 220-230, below) is an automatically updated, periodic monitor of one or more SONET rings.

The visualization process begins at step 204, where a user selection is received. The user selection at this step of the process 200 is for determining the configuration for the SONET ring to be displayed.

At step 206, a series of calculations and/or data queries are performed. Since the data queries often take a relatively long time (as compared to the calculations), these queries may be initiated first. For example, one or more queries can be implemented using TIRKS. The various nodes and links that have been specified are then queried and the information is returned.

Several calculations may be performed concurrently with the data queries. For example, the size and shape of the configuration for the SONET ring may be determined (e.g., ring configuration 110 of FIG. 3). In the embodiments of FIGS. 3-5, it is desired that the SONET ring be configured in a circle, with evenly spaced nodes and links. Once the nodes and links are drawn, their color (or other aspect) is drawn according to the query results and a predetermined legend, such as the legend 114 of FIG. 3, is provided.

At step 208, a response is made to a selected link or node. In the examples of FIGS. 3-5, node N1 is a default selection, but the user can select another node using the pointer device 26. Once selected, execution proceeds to step 210 where additional information is provided for the selected node and corresponding links. In the examples of FIGS. 3-5, this information is provided in the link area 104 and the node area 106.

Upon completion of steps 208-210 (or prior to their completion), execution proceeds to step 212 where a response is made to a link or node identified using the pointer device 26. In the present embodiment, the identification of a link or node made at step 208 is different than that made at step 212. For example, in step 208, the link or node can be selected by "clicking" the pointer device or pressing an appropriated key on a keyboard. In step 212, the link or node is identified by merely positioning the pointer device over the corresponding component. Once identified, execution proceeds to step 214 where additional information is provided for the selected component. In the examples of FIGS. 3-5, this information is provided in pop-up windows 122, 136, 146, and 152. Execution then returns to step 202 for additional user selection.

The review process begins at step 220, where a series of calculations and/or data queries are performed. Since the data queries often take a relatively long time (as compared to the calculations), these queries may be initiated first. For example, one or more queries can be implemented using TIRKS. The various nodes and links that have been specified are then queried and the information is returned. Several calculations may be performed concurrently with the data queries.

At step 222, a link exhaust calculation is made. The link exhaust calculation is made by examining a usage trend (e.g., from the previous 12 months) and the amount of spare bandwidth (from the spare links), to predict when the network will be exhausted.

At step 224, each link and node is reviewed. The review may consider the different technologies (e.g., OC-3, OC-12, TS3) of the components, as identified by a stored reference value (e.g., in the server 32 of the monitor system 20). Each technology can be detected and tracked, and exhaust conditions can be thereby determined. The information may then be presented to the user, such as through a demand and capacity (D&C) chart on the display 22.

At step 226, a determination is made as to whether the user has modified any preset values. For example, the user may modify a technology type for a component, may change a predefined exhaust condition (e.g., from 20% to 10% spare), and so forth. If the user does make modifications, execution returns to step 220.

At step 228, the user can be notified in other manners. For example, the file server 32 can send an e-mail to the user notifying any upcoming exhaust conditions.

At step 230, the review process may be performed on an automatic, cyclic basis. For example, the review process may be performed every week. To illustrate this process, the flow chart of FIG. 7 illustrates execution returns to step 220. If an automatic process is not desired, execution returns to step 202.

It is understood that the process 200 is illustrated in a top-down flow chart to provide a simple and clear description. In actuality, many steps may be performed simultaneously, and may actually be performed by different nodes and/or different components of the monitor system 20 and the SONET ring 10. Such processing distribution is well known to those of ordinary skill in the art.

CONCLUSION

Thus, there is disclosed a system and method for providing interactive topology graphs for visualization and characterization of SONET consumption patterns. In some embodiments, the system and method allow a user to quickly determine the status of the SONET ring. This status can be related to such things as available bandwidth and other consumption-related items. The system may be interactive, and can quickly provide specific information without providing superfluous or unnecessary information to the user. In addition, implementations of the various embodiments described above can be performed very quickly, as compared to conventional techniques, such as running a TIRKS online report facility.

While the invention has been particularly shown and described with reference to the preferred embodiment thereof, it will be understood by those skilled in the art that various changes in form and detail may be made therein without departing form the spirit and scope of the invention.

What is claimed is:

1. A computer program encoded on a computer readable medium for visualizing at least a portion of a synchronized optical network (SONET) ring, the computer program comprising instructions for:
   providing one or more menus from which a user may specify specific components of the SONET ring;
   calculating and drawing a graphical representation of the SONET ring illustrating each node and link of the SONET ring specified by the user;
   receiving a user selection for identifying one node of the SONET ring;
   accessing an inventory system for data related to the user selection; and
   displaying more detailed information about the selected node.

2. The computer program of claim 1 wherein the more detailed information includes individual information about any links connected to the selected node.

3. The computer program of claim 1 wherein the more detailed information includes individual information about any drop ports on the selected node.

4. The computer program of claim 1 wherein the instructions for calculating and drawing a graphical representation of the SONET ring include:
   determining a percent consumed and a percent spare capacity for each node and graphically displaying the percentages with the graphical representation of the node.

5. The computer program of claim 4 wherein the instructions for calculating and drawing a graphical representation of the SONET ring further include:
   determining a percent restricted and a percent pending for each node and graphically displaying the percentages with the graphical representation of the node.

6. The computer program of claim 1 wherein the instructions for calculating and drawing a graphical representation of the SONET ring include:
   determining a consumed or spare status for each link and graphically displaying the status with the graphical representation of the link.

7. The computer program of claim 1 wherein the instructions for calculating and drawing a graphical representation of the SONET ring include:
   determining a utilized drop port for each node and link connection and graphically displaying the utilized drop port with the graphical representation of the node.

8. The computer program of claim 1 wherein the instructions for calculating and drawing a graphical representation of the SONET ring include:
   determining whether each node serves as a hub and graphically displaying a hub designation with the graphical representation of the corresponding node.

9. The computer program of claim 1 wherein user selection for the node is a default selection.

10. The computer program of claim 1 further comprising instructions for:
    receiving a user selection for identifying one link of the SONET ring; and
    displaying more detailed information about the identified link.

11. The computer program of claim 10 wherein the more detailed information about the identified link includes a consumption status.

12. A monitoring system for providing interactive topology information about a ring-type network, the monitoring system comprising:
    an inventory system for collecting status data from the ring-type network in a raw format; and
    a computer system capable of retrieving raw format status data from the inventory system, and further including:
    means for providing one or more menus from which a user may specify a group of components of the ring-type network;
    means for calculating and drawing a graphical representation of the ring-type network illustrating each node and link of the group of components of the ring-type network specified by the user;
    means for receiving a user selection for identifying a selected component of the ring-type network; and
    means for displaying more detailed information about the selected component.

13. The monitoring system of claim 12 wherein the more detailed information about the selected component includes a consumption status.

14. The monitoring system of claim 12 wherein the selected component is a node of the ring-type network.

15. The monitoring system of claim 14 wherein the more detailed information includes individual information about any links connected to the selected node and individual information about any drop ports on the selected node.

16. The monitoring system of claim 14 wherein the means for calculating and drawing a graphical representation of the ring-type network includes:

computer instructions for determining a percent consumed and a percent spare capacity for each node and graphically displaying the percentages with the graphical representation of the node.

17. The monitoring system of claim 14 wherein the means for calculating and drawing a graphical representation of the ring-type network further includes:

computer instructions for determining a percent restricted and a percent pending for each node and graphically displaying the percentages with the graphical representation of the node.

18. The monitoring system of claim 14 wherein the means for calculating and drawing a graphical representation of the ring-type network includes:

computer instructions for determining a consumed or spare status for each link and graphically displaying the status with the graphical representation of the link.

19. The monitoring system of claim 14 wherein the means for calculating and drawing a graphical representation of the ring-type network includes:

computer instructions for determining a utilized drop port for each node and link connection and graphically displaying the utilized drop port with the graphical representation of the node.

20. The monitoring system of claim 14 wherein the means for calculating and drawing a graphical representation of the ring-type network includes:

computer instructions for determining whether each node serves as a hub and graphically displaying a hub designation with the graphical representation of the corresponding node.

21. The monitoring system of claim 14 wherein the more detailed information includes a mismatch identifier about any links that are inventoried differently by connecting nodes.

22. The monitoring system of claim 14 wherein the more detailed information includes an indicator that service is dropping at a specific node 23. The monitoring system of claim 12 wherein the ring-type network is a synchronized optical network, and the inventory system is a trunks integrated record keeping system.

24. The monitoring system of claim 12 wherein the more detailed information identifies bandwidth usage between two nodes.

25. The monitoring system of claim 12 wherein the more detailed information identifies drop ports connected to a specific link.

26. A monitoring system for providing topology information about a ring-type network, the monitoring system comprising:

a computer system including a system interface capable of retrieving raw format status data from an inventory system for collecting status data from the ring-type network in a raw format and a graphical user interface for providing one or more menus from which a user may specify specific components of the ring-type network, for calculating and drawing a graphical representation of the ring-type network illustrating the specific components of the ring-type network specified by the user, for receiving a user selection for identifying a selected component of the ring-type network, and for displaying more detailed information about the selected component.

27. The monitoring system of claim 26 wherein the more detailed information about the selected component includes a consumption status.

28. The monitoring system of claim 26 wherein the selected component is a node of the ring-type network.

* * * * *